UNITED STATES PATENT OFFICE.

WILLIAM G. CURTIS AND JOHN D. ISAACS, OF SAN FRANCISCO, CALIFORNIA.

PROCESS OF PRESERVING TIMBER.

SPECIFICATION forming part of Reissued Letters Patent No. 11,515, dated December 3, 1895.

Original No. 545,222, dated August 27, 1895. Application for reissue filed October 22, 1895. Serial No. 566,566.

*To all whom it may concern:*

Be it known that we, WILLIAM G. CURTIS and JOHN D. ISAACS, citizens of the United States, residing in the city and county of San Francisco, State of California, have invented an Improvement in Processes of Preserving Timber; and we hereby declare the following to be a full, clear, and exact description of the same.

Our invention relates to an improved process of treating timber of all descriptions with preservative fluids—such as, for instance, creosote-oil—for the purpose of preventing decay or deterioration.

It consists of a series of operations, which will be more fully explained in the following specification.

The object of our invention is to provide a more perfect preliminary drying of the timber, a thorough impregnation with the preservative fluid, a less loss of the preservative fluid by evaporation, and a less amount of time necessary for the completion of the process. Hitherto timber has been treated in various ways. In one process it is first subjected to live steam within a closed retort; secondly, a vacuum is produced, and then the steaming and vacuum are alternately produced until the timber is dry. The preservative liquid is then injected under pressure. In other processes the timber is placed in closed chambers, and after the requisite steaming the preservative fluid is introduced into it in the form of a vapor; but in all of these processes, however carried out, the timber is checked and cracked, so as to injure the product, the drying is ineffective, a very considerable time is necessary to complete the process, and when a vacuum is employed there is a great waste of the preservative material, which distills off very rapidly on account of the vacuum.

In our invention we place the timber in retorts with vents left open to the air and then introduce the creosote-oil in sufficient quantities to submerge the timber in the same. The oil is heated above the boiling-point of the sap without any vacuum or reduction of pressure being employed. This expels all the sap from the timber, while the heat of the creosote-oil is not sufficient to cause it to rapidly evaporate. The vents are then closed, and the creosote or preservative liquid is then forced under pressure into the pores of the wood to the desired extent.

Having thus described our invention, what we claim as new, and desire to secure by Letters Patent, is—

The improved process herein described of impregnating timbers with preservative fluids, consisting in placing the timber in retorts, with vents left open to the air, then introducing creosote in sufficient quantities to submerge the timber in the same, then heating the timber and creosote to a temperature above the boiling point of the sap, at ordinary atmospheric pressure whereby the sap is expelled from the timber, then closing the vents of the retorts and by the application of pressure forcing the creosote into the pores of the timber to take the place of the evaporated sap, substantially as herein described.

In witness whereof we have hereunto set our hands.

WILLIAM G. CURTIS.
JOHN D. ISAACS.

Witnesses:
GEO. H. STRONG.
S. H. NOURSE.